(12) United States Patent
Raker et al.

(10) Patent No.: US 7,735,647 B2
(45) Date of Patent: Jun. 15, 2010

(54) SHIPPING CRADLE FOR TRAYS OF SEEDLINGS AND THE LIKE

(75) Inventors: Timothy R. Raker, Jonesville, MI (US); David F. Raker, Jonesville, MI (US); Gerald R. Raker, Jonesville, MI (US)

(73) Assignee: C. Raker & Sons, Inc., Litchfield, MI (US)

( * ) Notice: Subject to any disclaimer, the term of this patent is extended or adjusted under 35 U.S.C. 154(b) by 834 days.

(21) Appl. No.: 10/885,834

(22) Filed: Jul. 7, 2004

(65) Prior Publication Data

US 2005/0005519 A1  Jan. 13, 2005

Related U.S. Application Data

(60) Provisional application No. 60/486,009, filed on Jul. 10, 2003.

(51) Int. Cl.
- *B65D 85/50* (2006.01)
- *B65D 21/00* (2006.01)
- *B65D 6/04* (2006.01)
- *A01G 9/10* (2006.01)

(52) U.S. Cl. ............ 206/423; 206/561; 206/509; 47/77

(58) Field of Classification Search ............ 206/423, 206/561–565, 510, 503, 505–507, 509, 556, 206/553, 499; 47/75, 77, 66.5, 86
See application file for complete search history.

(56) References Cited

U.S. PATENT DOCUMENTS

| | | | |
|---|---|---|---|
| 2,758,750 A | | 8/1956 | Stroop |
| 2,826,332 A | * | 3/1958 | Hudson ............ 220/761 |
| 3,167,211 A | * | 1/1965 | Mccormick ............ 206/170 |
| 3,191,796 A | | 6/1965 | Schwartz et al. |
| 3,197,058 A | | 7/1965 | Hale |
| 3,638,827 A | | 2/1972 | Lau, Jr. et al. |
| 3,773,213 A | | 11/1973 | Fredrick |
| 3,937,327 A | | 2/1976 | Carroll |
| 4,027,796 A | | 6/1977 | Martin |
| 4,093,070 A | | 6/1978 | Stahl |
| 4,101,049 A | | 7/1978 | Wallace et al. |

(Continued)

FOREIGN PATENT DOCUMENTS

GB   2263101   7/1993

OTHER PUBLICATIONS

Exhibit A is "Wellmaster Carts", date unknown, at least as early as Jul. 1, 2002.

(Continued)

*Primary Examiner*—Mickey Yu
*Assistant Examiner*—Melissa L Lalli
(74) *Attorney, Agent, or Firm*—Price, Heneveld, Cooper, DeWitt & Litton, LLP

(57) ABSTRACT

A shipping cradle for seedlings and the like is both nestable and stackable. When stacked, a gap is formed between vertically-adjacent cradles to permit insertion and removal of trays of seedlings, and to permit visual inspection of the seedlings. A drainage system includes a series of channels and openings that prevent water from draining onto seedlings positioned in the lower cradles. The cradles are lightweight, and can be shipped in the nested position to substantially reduce shipping costs.

4 Claims, 15 Drawing Sheets

U.S. PATENT DOCUMENTS

| | | | | |
|---|---|---|---|---|
| 4,139,098 | A | * | 2/1979 | Mollon .................. 206/507 |
| 4,189,052 | A | | 2/1980 | Carroll et al. |
| 4,205,749 | A | | 6/1980 | Carroll et al. |
| 4,236,350 | A | | 12/1980 | Hasselbach, Sr. |
| 4,316,540 | A | | 2/1982 | Lapham |
| 4,334,616 | A | | 6/1982 | Wilson |
| 4,335,068 | A | | 6/1982 | Hemery |
| 4,343,400 | A | | 8/1982 | Faucillon |
| 4,386,700 | A | | 6/1983 | Deaton |
| 4,428,493 | A | * | 1/1984 | McDonough .............. 220/555 |
| 4,579,489 | A | * | 4/1986 | Sarantitis .................. 410/80 |
| 4,872,589 | A | * | 10/1989 | Englehart et al. ...... 229/117.13 |
| 4,944,398 | A | | 7/1990 | Gatt |
| 5,287,966 | A | * | 2/1994 | Stahl ...................... 206/509 |
| 5,704,482 | A | * | 1/1998 | Apps et al. ............... 206/510 |
| 5,752,602 | A | * | 5/1998 | Ackermann et al. ......... 206/507 |
| 5,855,277 | A | | 1/1999 | Apps et al. |
| 6,039,202 | A | * | 3/2000 | Olstad et al. ............... 220/533 |
| 6,266,919 | B1 | | 7/2001 | Hoium, Jr. et al. |
| 6,526,693 | B2 | * | 3/2003 | Cochran .................. 47/66.5 |
| 6,851,221 | B2 | * | 2/2005 | Layt et al. .................. 47/86 |

OTHER PUBLICATIONS

Exhibit B is "Universal 600 Series", date unknown, at least as early as Jul. 1, 2002.
Exhibit C is "T.I.S. Cart and Rack Systems", date unknown, at least as early as Jul. 1, 2002.
Exhibit D is "Wellmaster Carts", date unknown, at least as early as Jul. 1, 2002.
Exhibit E is "Plant Transport Cart", date unknown, at least as early as Jul. 1, 2002.
Exhibit F is "Ship 'N Shop Carts", date unknown, at least as early as Jul. 1, 2002.
Exhibit G is "Standard or High-Cube Plant Transport Carts", date unknown, at least as early as Jul. 1, 2002.
Exhibit H is "European Style Plant Transport Carts", date unknown, at least as early as Jul. 1, 2002.
Exhibit I is "Mobile Gro-Cart", date unknown, at least as early as Jul. 1, 2002.

* cited by examiner

US 7,735,647 B2

SHIPPING CRADLE FOR TRAYS OF SEEDLINGS AND THE LIKE

CROSS-REFERENCE TO RELATED APPLICATION

The present application claims the benefit of U.S. Provisional Application No. 60/486,009, filed Jul. 10, 2003, the entire contents of which are incorporated by reference.

BACKGROUND OF THE INVENTION

Trays of seedlings and the like have been shipped in steel carts having a plurality of shelves and wheels. However, such carts are quite heavy and expensive, and also take up substantial space. Thus, substantial expense is incurred in returning the empty carts due to the weight of the carts and the space required. Furthermore, such carts are quite expensive, and are often lost or stolen during the shipping process, such that substantial additional expense can be incurred due to the replacement cost. Seedlings or other plants have also been shipped in cardboard boxes and the like. However, such boxes may be prone to damage during shipping due to impacts, or to water damage if the seedlings are watered.

SUMMARY OF THE INVENTION

One aspect of the present invention is a shipping cradle for transport of trays of seedlings and the like. The shipping cradle includes a vacuum formed body made of a thin sheet of polymer material having generally constant wall thickness. A body includes at least first, second, third, and fourth upwardly extending generally parallel walls with a first tray support surface extending between the first and second walls to define a first tray support area. A second tray support surface extends between the second and third walls to define a second tray support area, and a third tray support surface extends between the third and fourth walls to define a third tray support area. The first and fourth walls include a main wall section and an offset wall section to permit nesting of vertically adjacent cradles when vertically adjacent cradles have the same orientation, and for stacking of cradles in a spaced apart configuration when vertically adjacent cradles are oriented 180° opposite one another.

Another aspect of the present invention is a shipping cradle for transport of trays of seedlings and the like. The shipping cradle includes a body made of a polymer material and defining a plurality of tray support areas. The body has a perimeter defining opposite side edges that are spaced apart about 43.5 inches or less to fit closely within a pallet having an internal dimension of at least about 43.5 inches.

Yet another aspect of the present invention is a method of shipping trays of seedling. The method includes providing a plurality of shipping cradles, each having at least one tray support area. The cradles are nestable to form a stack of nested cradles when vertically adjacent cradles have the same orientation, and the cradles are stackable when vertically adjacent cradles are oriented one hundred and eighty degrees opposite one another. The tray support areas are vertically spaced a first distance from lower surfaces of cradles immediately above tray support areas to define heights sufficient to accommodate trays of seedlings when the cradles are stacked. The tray support areas are closely spaced from lower surfaces of cradles immediately above tray support areas when nested to define a second distance substantially less than the first distance. The method includes positioning a plurality of trays of seedlings in the tray support areas, and stacking a plurality of cradles holding trays of seedlings. The stacked cradles are shipped from a first location to a predetermined remote location, and at least some of the trays of seedlings are removed at the remote location. Empty cradles are nested, and the empty, nested cradles are shipped back to the first location.

These and other features, advantages, and objects of the present invention will be further understood and appreciated by those skilled in the art by reference to the following specification, claims, and appended drawings.

BRIEF DESCRIPTION OF THE DRAWINGS

FIG. 14 is a plan view of a stack of shipping cradles; and

DETAILED DESCRIPTION OF PREFERRED EMBODIMENT

Figure 7:
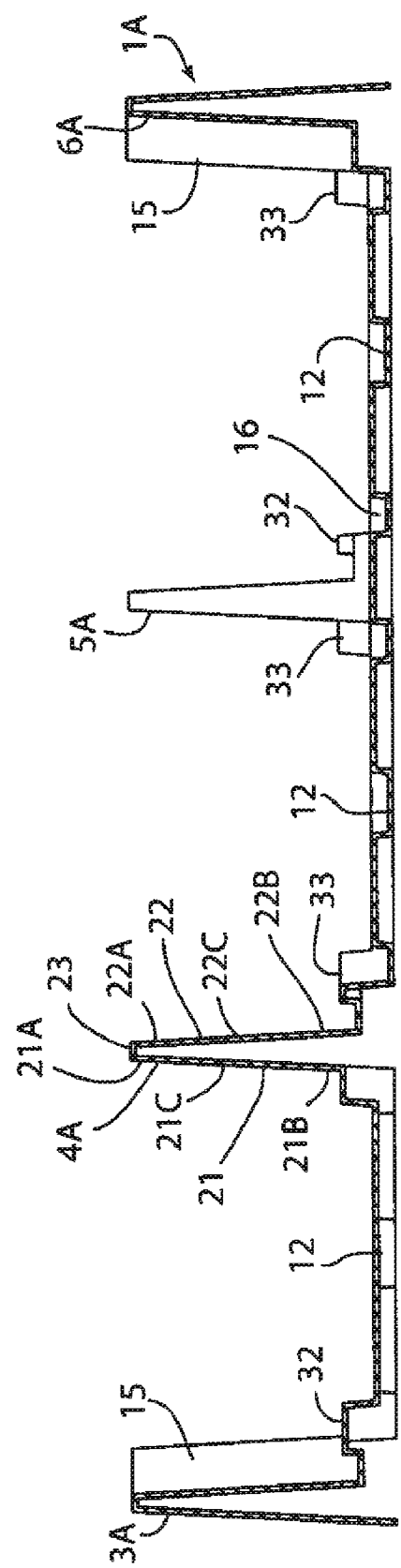
FIG. 7 is a cross-sectional view of a shipping cradle taken along the line VII-VII.

For purposes of description herein, the terms "upper," "lower," "right," "left," "rear," "front," "vertical," "horizontal," and derivatives thereof shall relate to the invention as oriented in FIG. 7. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
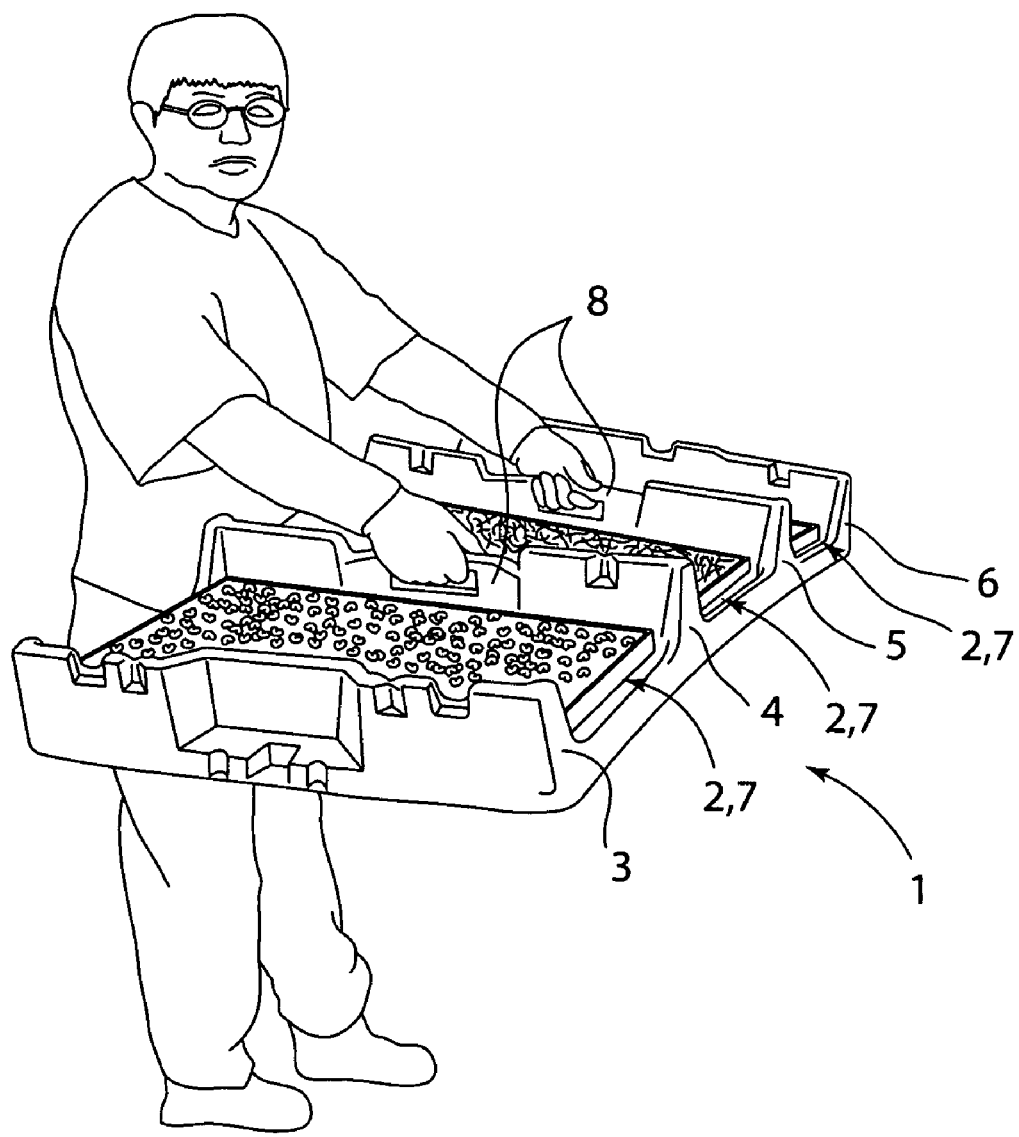
FIGS. 1-6 are photographs illustrating a shipping cradle according to the present invention.

A shipping cradle according to the present invention is illustrated in the photograph marked FIG. 1. The shipping cradle 1 is nestable, stackable, and is also compatible with existing plastic pallets utilized to ship automotive parts and the like. The shipping cradle 1 is made of a relatively thin sheet of high density polyethylene (HDP) that is vacuum-formed into the three-dimensional shape illustrated in FIG. 1. As described in more detail below, the shipping cradle 1 includes raised walls 3, 4, 5, and 6 that form three support areas 7, each of which may receive a tray 2 of seedlings. Handles 8 formed in wall sections 4 and 5 provide a convenient means for manual transport of the shipping container 1.

Figure 2:
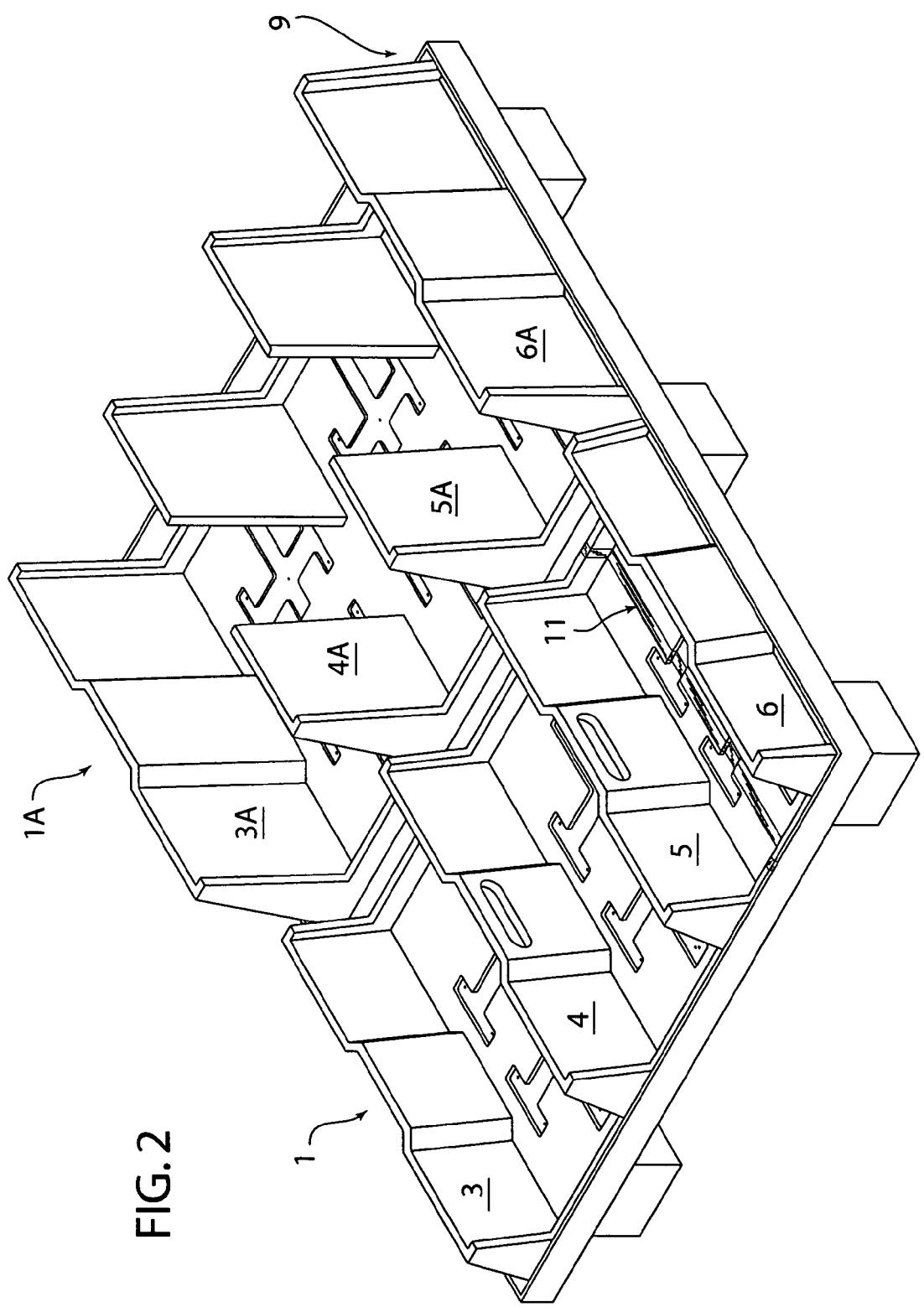
Figure 3:
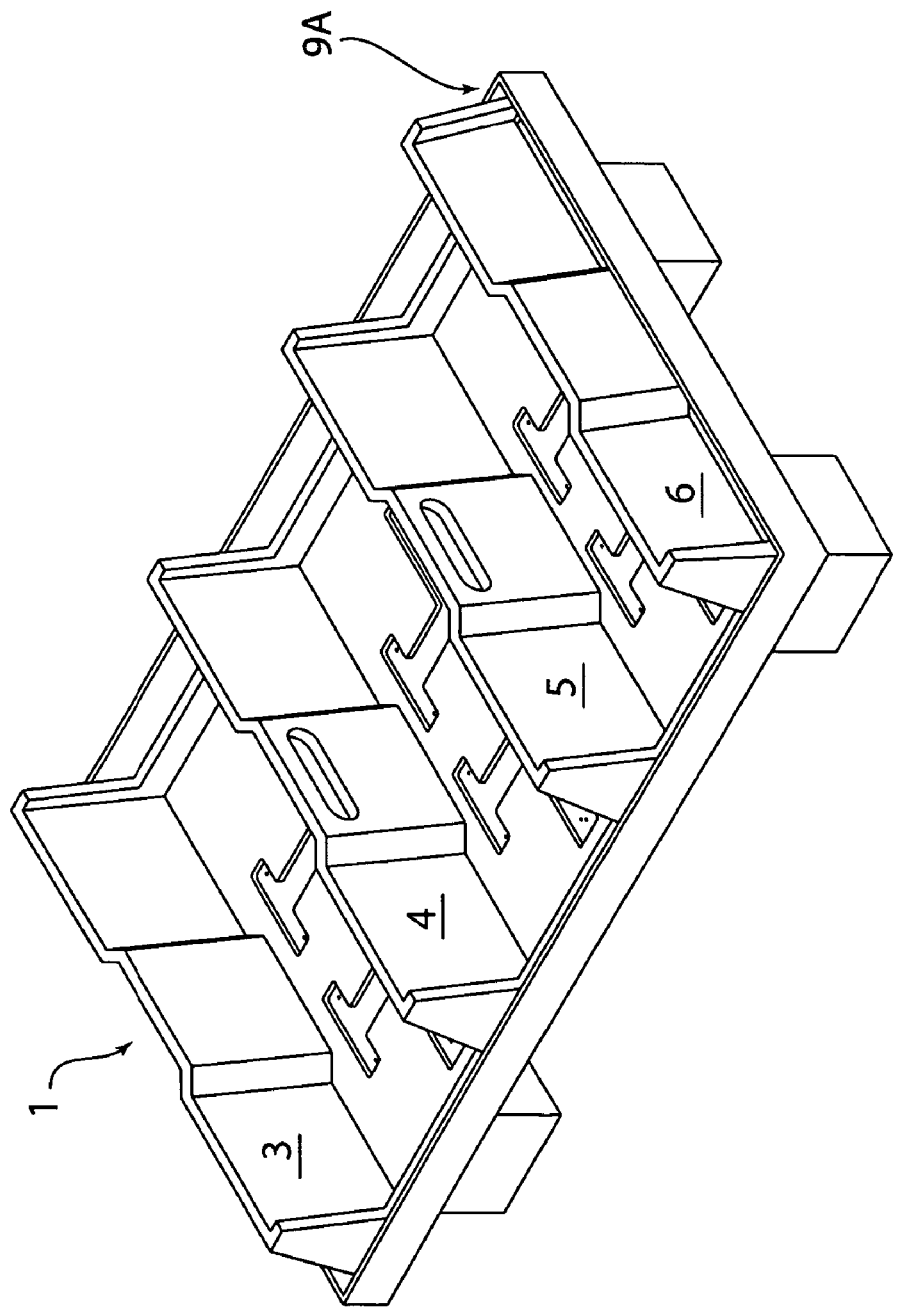

With further reference to FIG. 2, a second embodiment 1A of the shipping cradle is substantially similar to shipping cradle 1 of FIG. 1, except that the walls 3A, 4A, 5A, and 6A are six inches high, instead of three inches high. The shipping cradles 1 and 1A are sized so that a pair of shipping cradles can be received within a pallet 9. Pallet 9 is an existing prior art pallet ("Mirror Image Pallet Lid Combination", Model No. 20264) available from Robinson Industries of Coleman, Mich. previously utilized for shipping automotive parts and the like. Pallet 9 includes openings (not shown) to provide for drainage. With reference to FIG. 2A, a half width "single stack" pallet 9A is similar to pallet 9 except that it is sized to accept a single stack of pallets 1 and/or 1A. With further reference to FIG. 3, the shipping cradles 1 can be stacked, thereby forming gaps 10 between the vertically-adjacent shipping cradles 1. The gaps 10 have sufficient size to permit the trays of plants to be inserted or removed when the shipping cradles are stacked as illustrated in FIG. 3.

Figure 4:
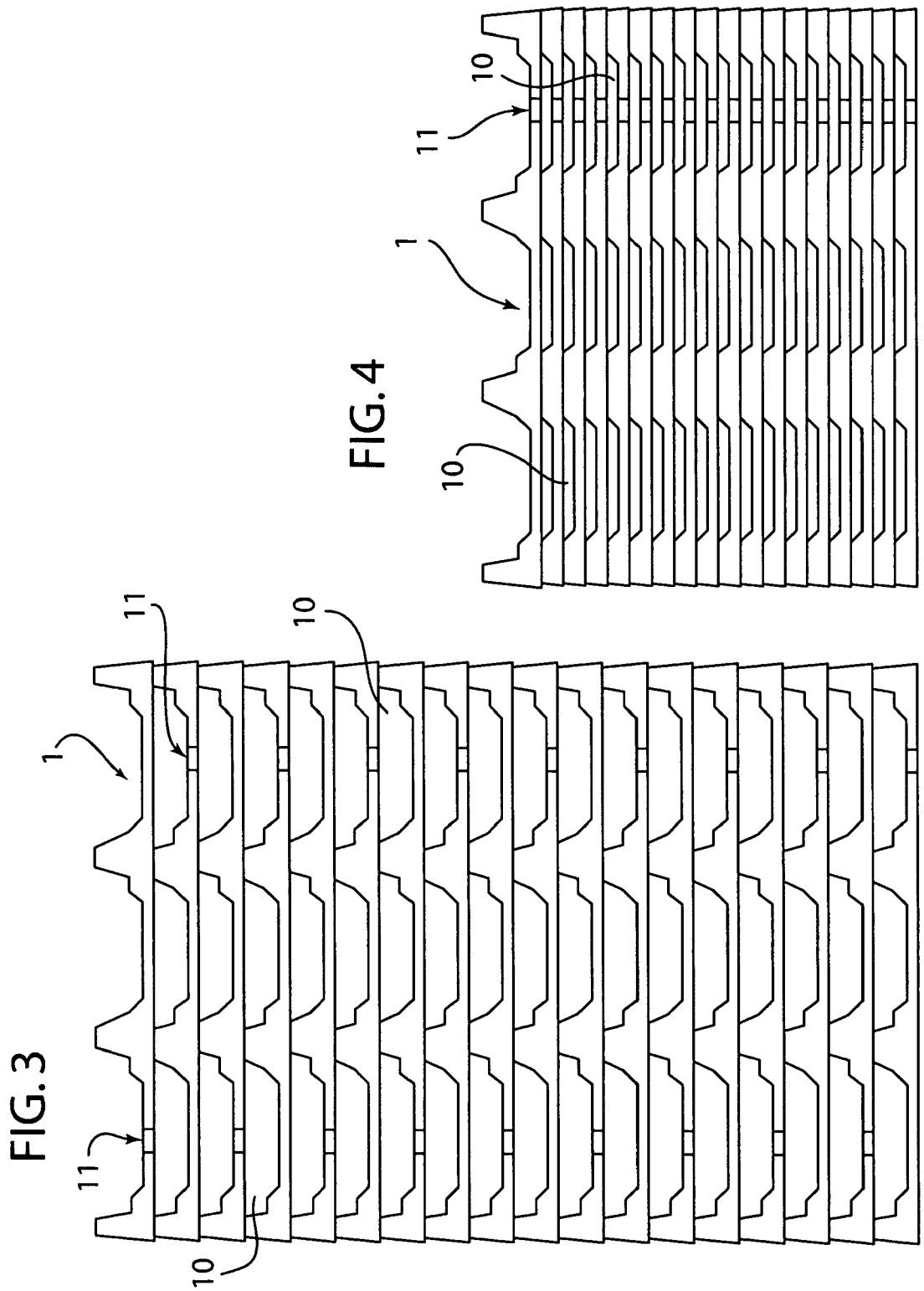
Figure 5:
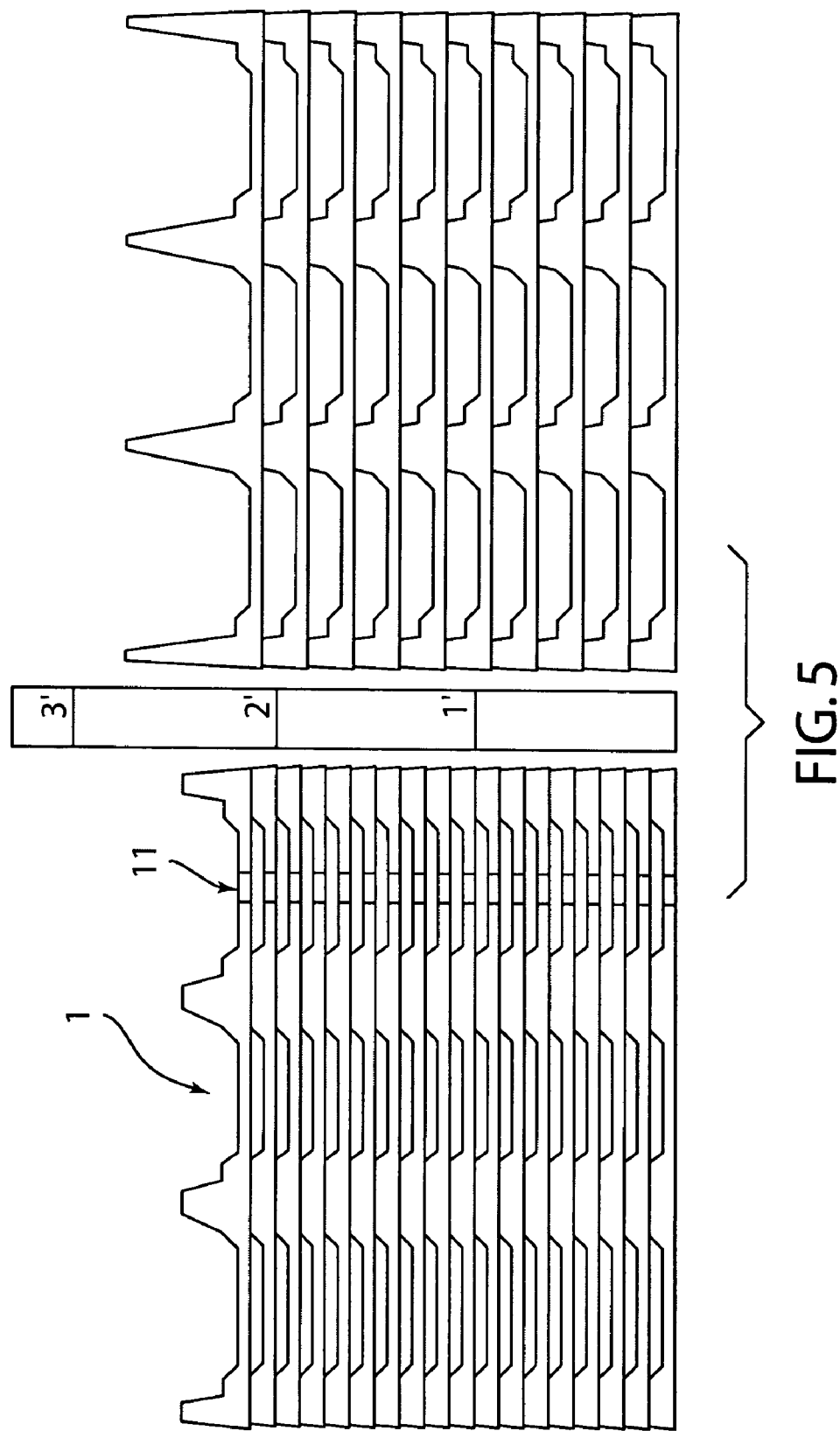

With further reference to FIG. 4, the shipping cradles 1 may also be nested to reduce the overall height after the trays of plants 2 are removed. The nesting feature of the shipping cradles 1 substantially reduces the cost of shipping the empty cradles 1 back to the greenhouse because the amount of space required is substantially reduced in the nested configuration. With further reference to FIGS. 3-6, in a preferred embodiment, the shipping cradle 1 includes a band or portion 11 of a different color, or other marker to indicate the orientation of the shipping cradle. For nesting, the portions 11 or other marker of vertically adjacent shipping cradles 1 are oriented to the same side. Alternately, the portion 11 are positioned in altering left and right hand positions when the shipping cradles 1 are stacked.

Figure 6:
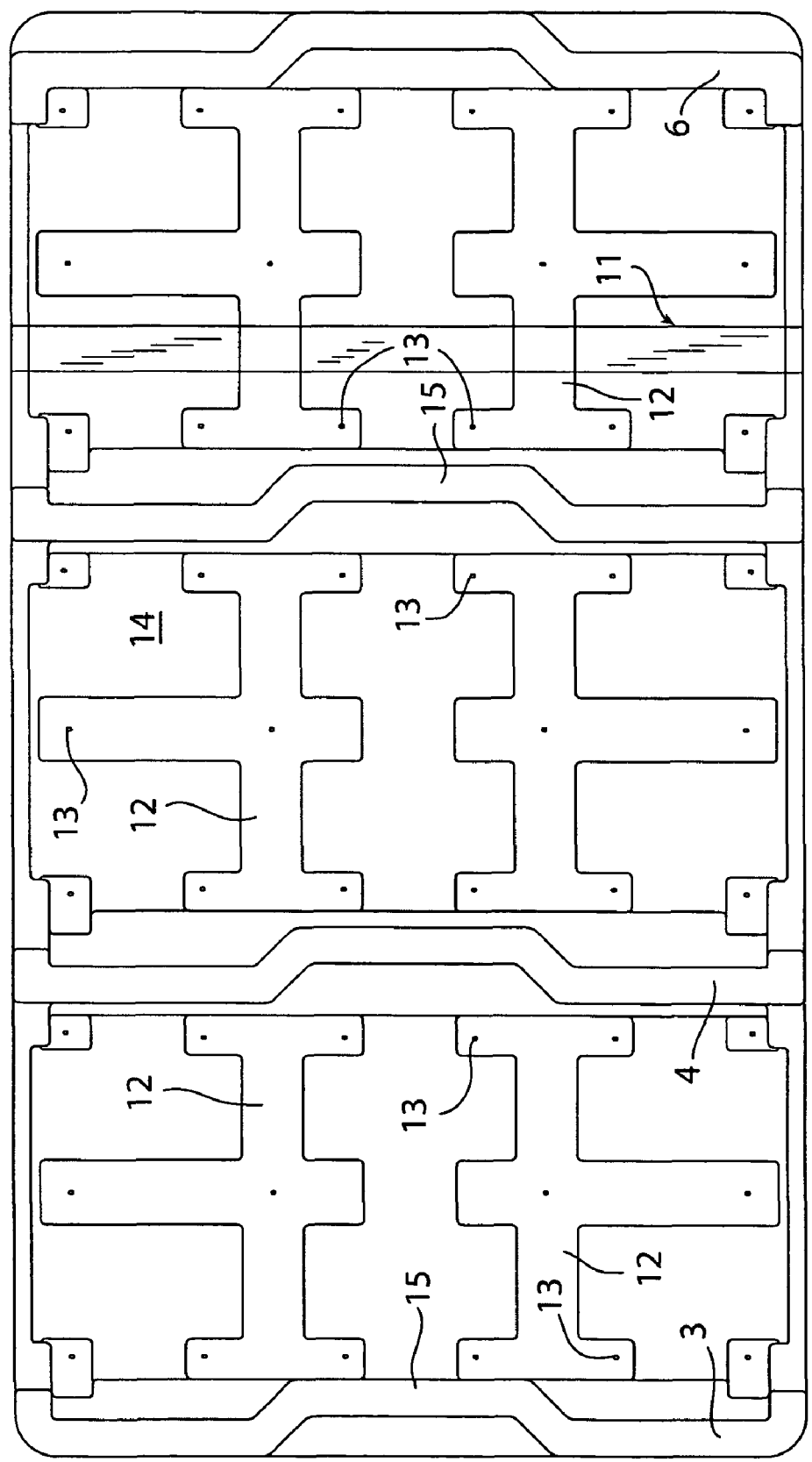

With further reference to the photograph marked FIG. 6, bottoms 14 of shipping cradle 1 form upwardly-facing tray support surfaces and include a series of channels 12 and openings 13. In use, channels 12 drain water that may be applied to the trays of seedlings 2. The openings 13 are positioned such that the water from an upper shipping cradle does not drain onto the seedlings positioned in the cradles below, thereby preventing over watering of the seedlings in the lower cradles 1.

As also illustrated in FIG. 6, and described in more detail below, the walls 3-6 include offset center portions 15 that permit nesting of vertically adjacent shipping cradles 1 when the offset portions are oriented in the same direction. Alternately, when the cradles 1 are stacked, the offset portions 15 contact the next vertically-adjacent shipping cradle 1 to provide for stacking. The geometry of the offset portions 15 prevents horizontal shifting of the shipping cradles 1 when stacked to thereby prevent the cradles from falling down to a nested configuration.

Figure 8:
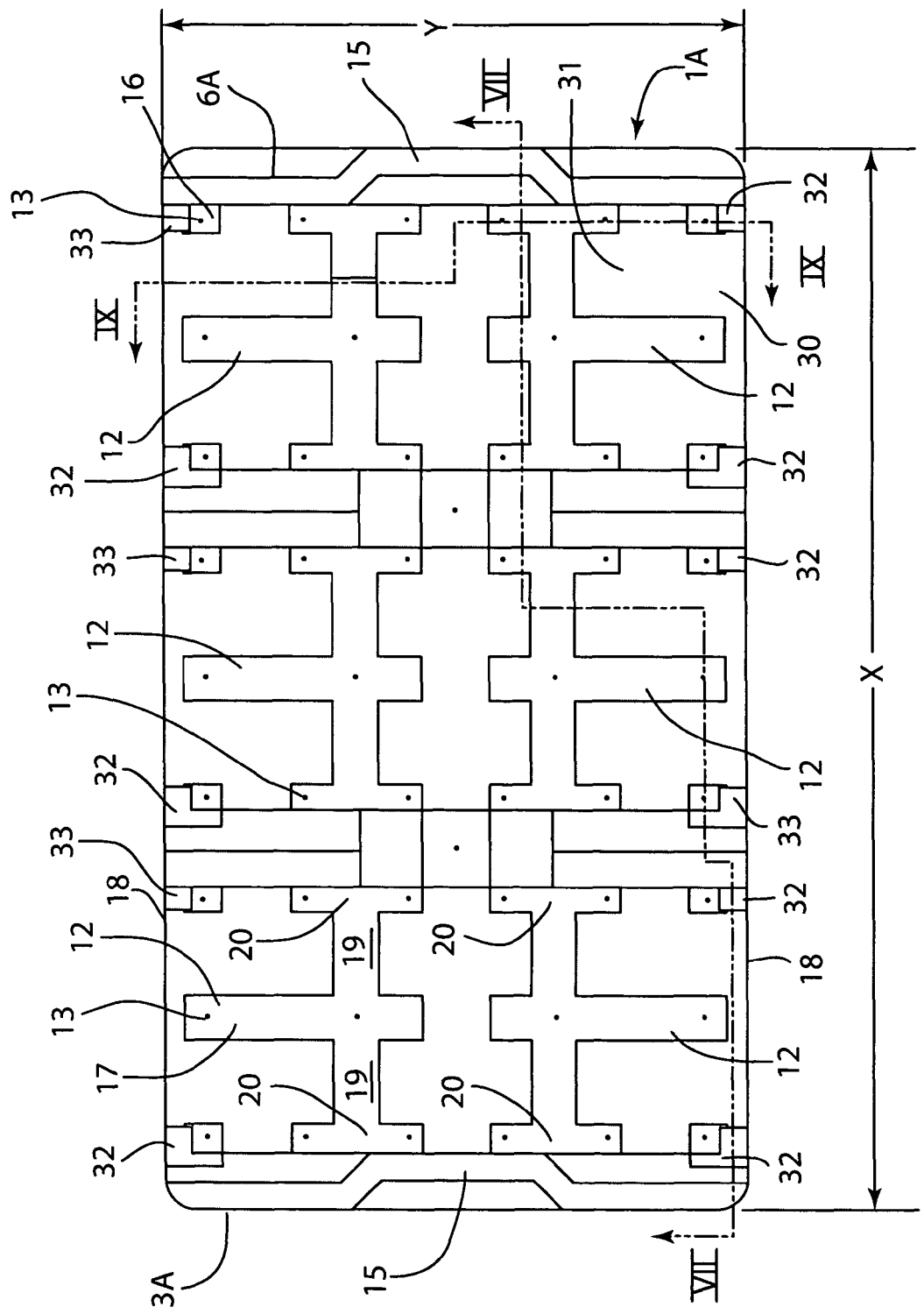
FIG. 8 is a plan view of the shipping cradle.
Figure 9:
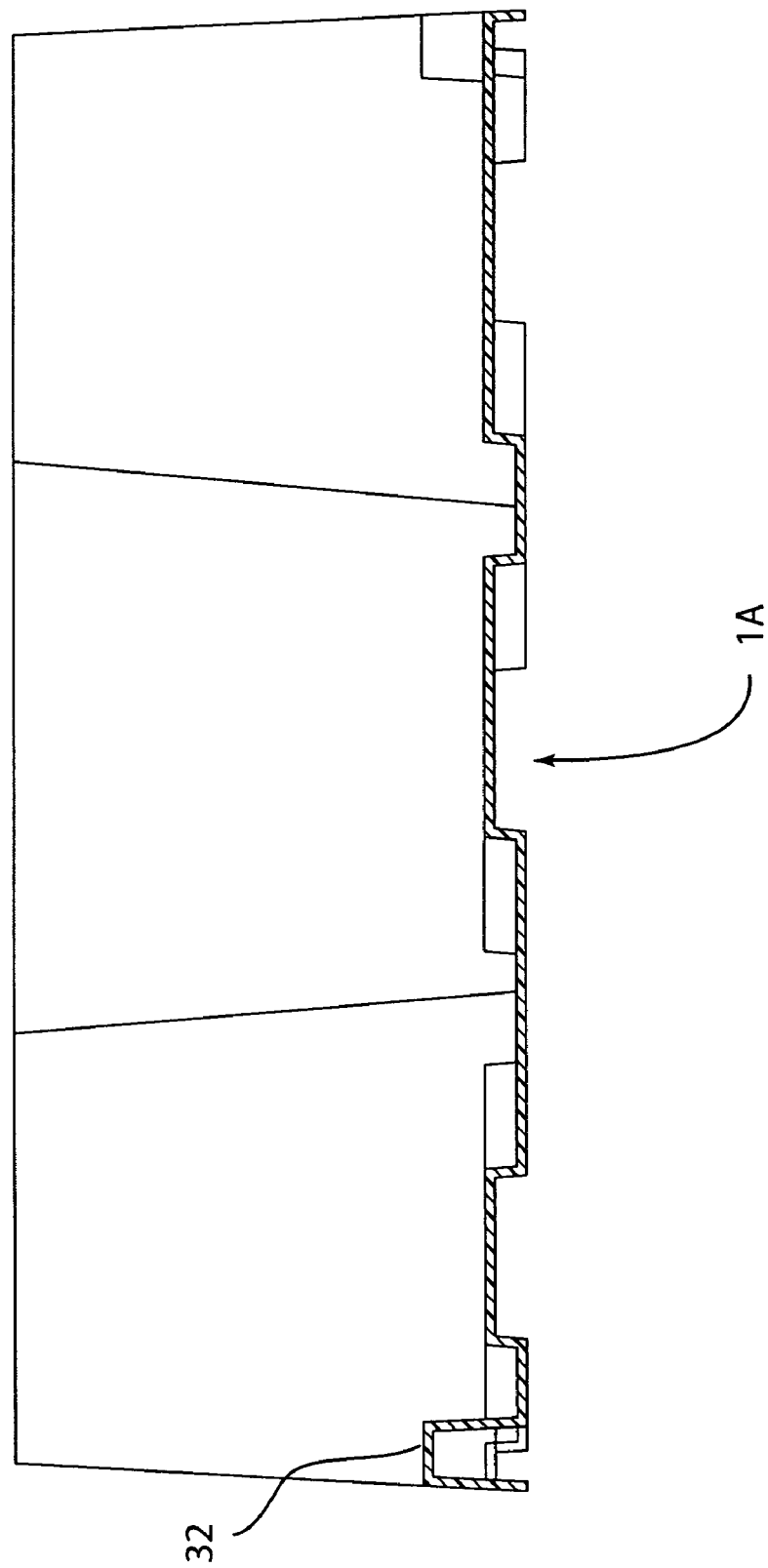
FIG. 9 is a cross-sectional view of the shipping cradle of FIG. 8 taken along the line IX-IX.

With further reference to FIGS. 7-9, a six-inch cradle 1A includes a plurality of channels 12 for routing and draining water through openings 13 as described above. The cradle 1A also included pockets 16 with openings 13 that also drain water from the upper cradles to the lower cradles. As described above, each of the walls 3A-6A include offset center portions 15 that provide for stacking when alternating cradles 1A are oriented 180° opposite to one another. Each of the channels 12 include a main portion 17 that extends outwardly towards the edges 18 of the cradle 1A, and also includes branches 19 that extend outwardly to end portions 20 to distribute the water to the openings 13. Because the pallets 9 have drainage openings (not shown) in the bottom surface, such that trays of seedlings 2 can be watered when a stack of cradles 1 or 1A and trays of seedlings 2 are positioned in the pallets 9. For clarity, the offset portions 15 are only shown for walls 3A and 6A in FIG. 8, but it will be understood that each of the walls 3A, 4A, 5A and 6A have substantially similar geometry, including offset portions 15. As illustrated in FIG. 7, each of the walls 3A-6A include thin webs or sidewalls 21 and 22 including upper portions 21A and 22A, lower portions 21B and 22B, and central portions 21C and 22C, respectively. Thin webs or sidewalls 21 and 22 taper towards one another and terminate at an upper end or edge portion 23 that extends transversely between thin webs or sidewalls 21 to form a U-shaped cross section that opens downwardly. The taper of the sidewalls 21 and 22 relative to one another permits the adjacent cradles to be nested, and also permits removal of the shipping cradle from the forming tool during vacuum forming of the shipping cradle. Cradle 1A includes raised corner supports 32 and 33 that extend upwardly around the corners of the trays of seedlings to hold the trays and prevent sliding of the trays. The cradle 1A has a dimension "X" of 43.50 inches and a dimension "Y" of 23.50 inches such that a pair of cradles 1A fit in a pallet 9 (FIG. 2) having internal dimensions of at least about 47.00 inches by 43.50 inches.

Figure 10:
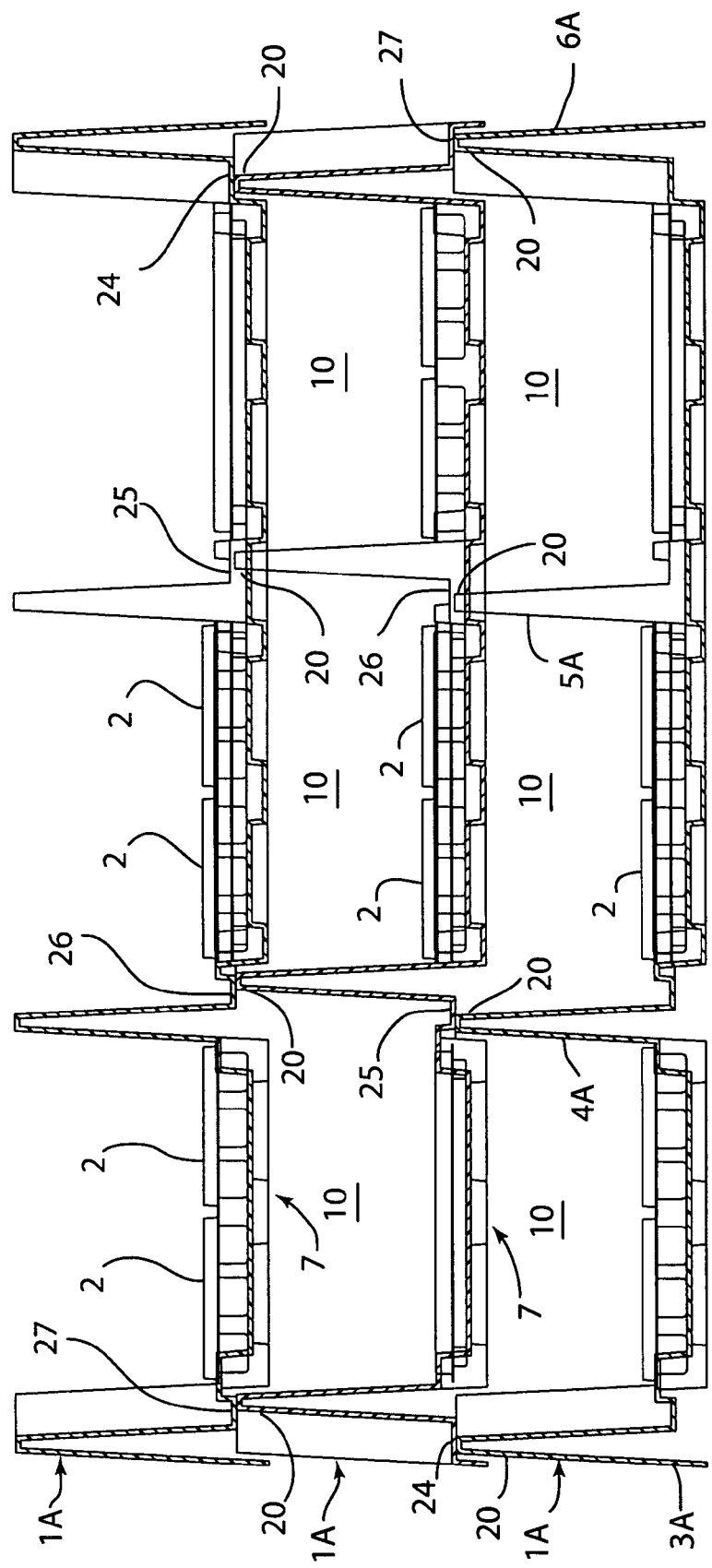
FIG. 10 is a cross-sectional view showing the shipping cradles in a stacked configuration taken along the line X-X.
Figure 11:
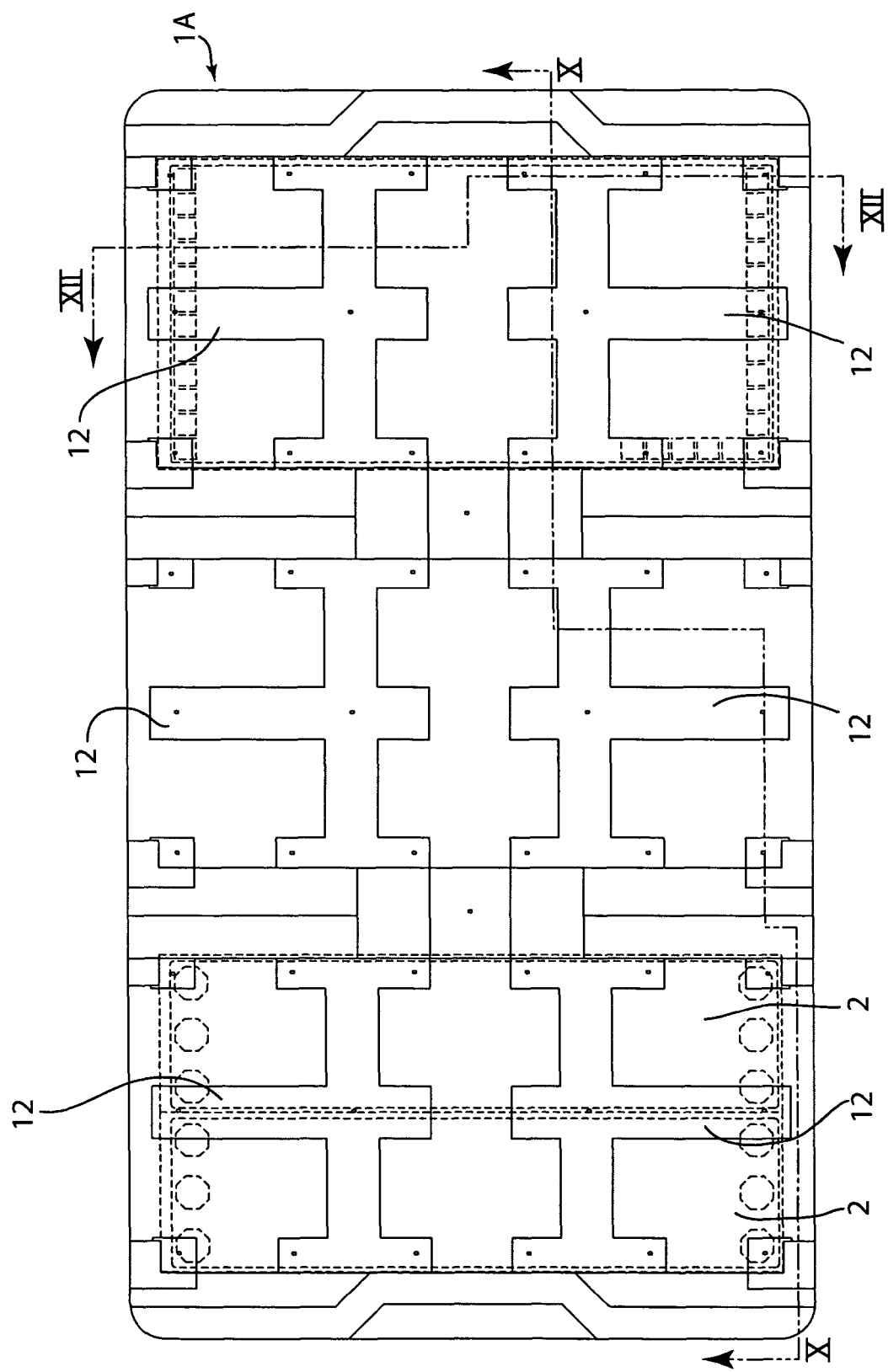
FIG. 11 is a plan view of a stack of shipping cradles.
Figure 12:
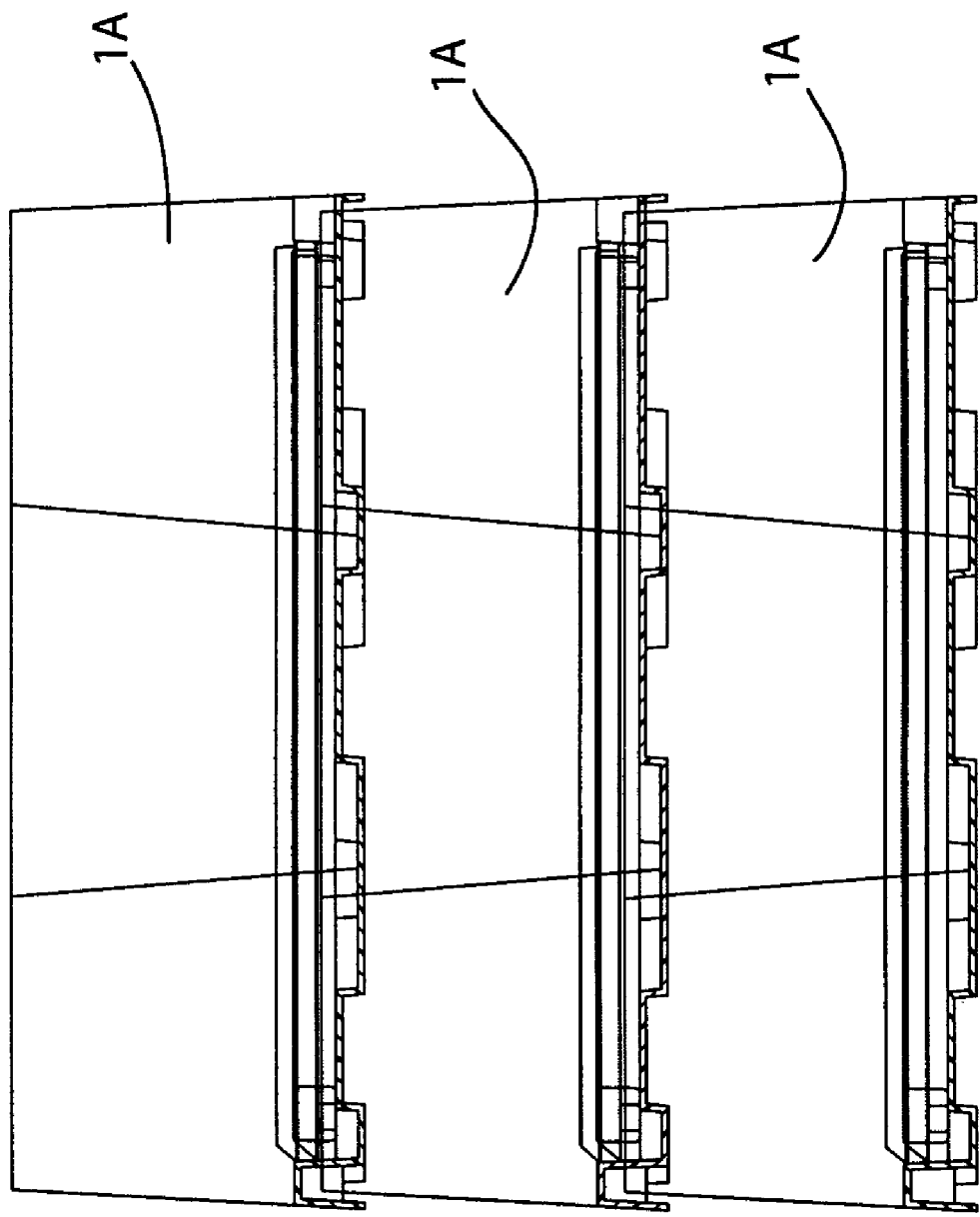
FIG. 12 is a cross-sectional view of the shipping cradles of FIG. 11 taken along the line XII-XII.

With further reference to FIGS. 10-12, when in the stacked configuration, the upper ends 20 of walls 3A-6A of a lowermost pallet abut the contact areas or lugs 24-27 of the vertically-adjacent pallet 1A. As discussed above, the trays of seedlings 2 are positioned in the support areas 7, and a gap 10 is formed between the adjacent cradles to permit insertion and removal of the trays 2. In the illustrated example, three cradles 1A are stacked together. However, the construction of the sidewalls 3A-6A and the configuration of the contact areas 24-27 provides sufficient strength to permit stacking to heights of at least 11-12 cradles. This permits a relatively large number of trays of seedlings to be shipped in a space efficient manner.

Figure 13:
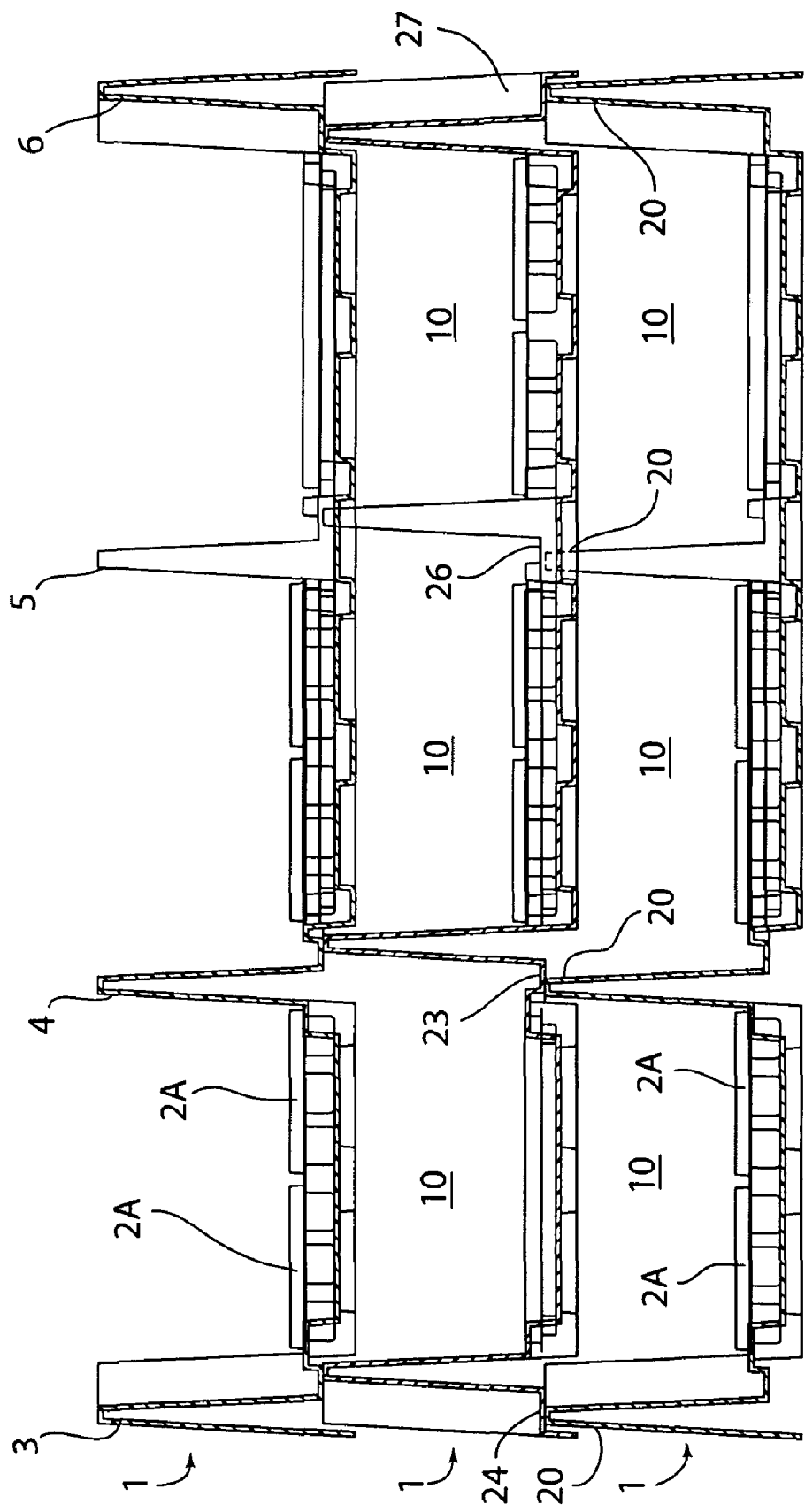
FIG. 13 is a cross-sectional view of a stack of three-inch high shipping cradles taken along the line XIII-XIII.
Figure 14:
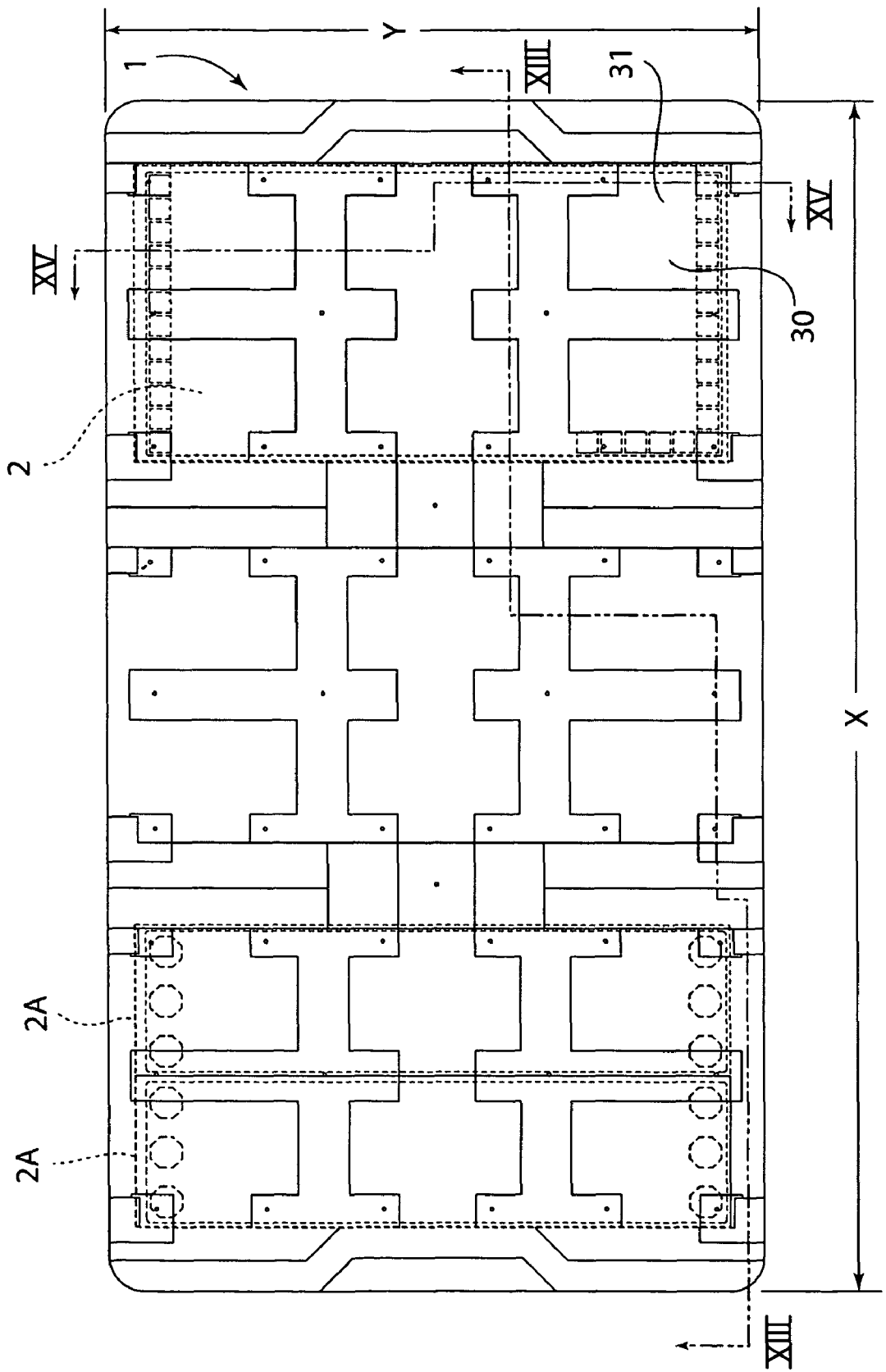
FIG. 14.
Figure 15:
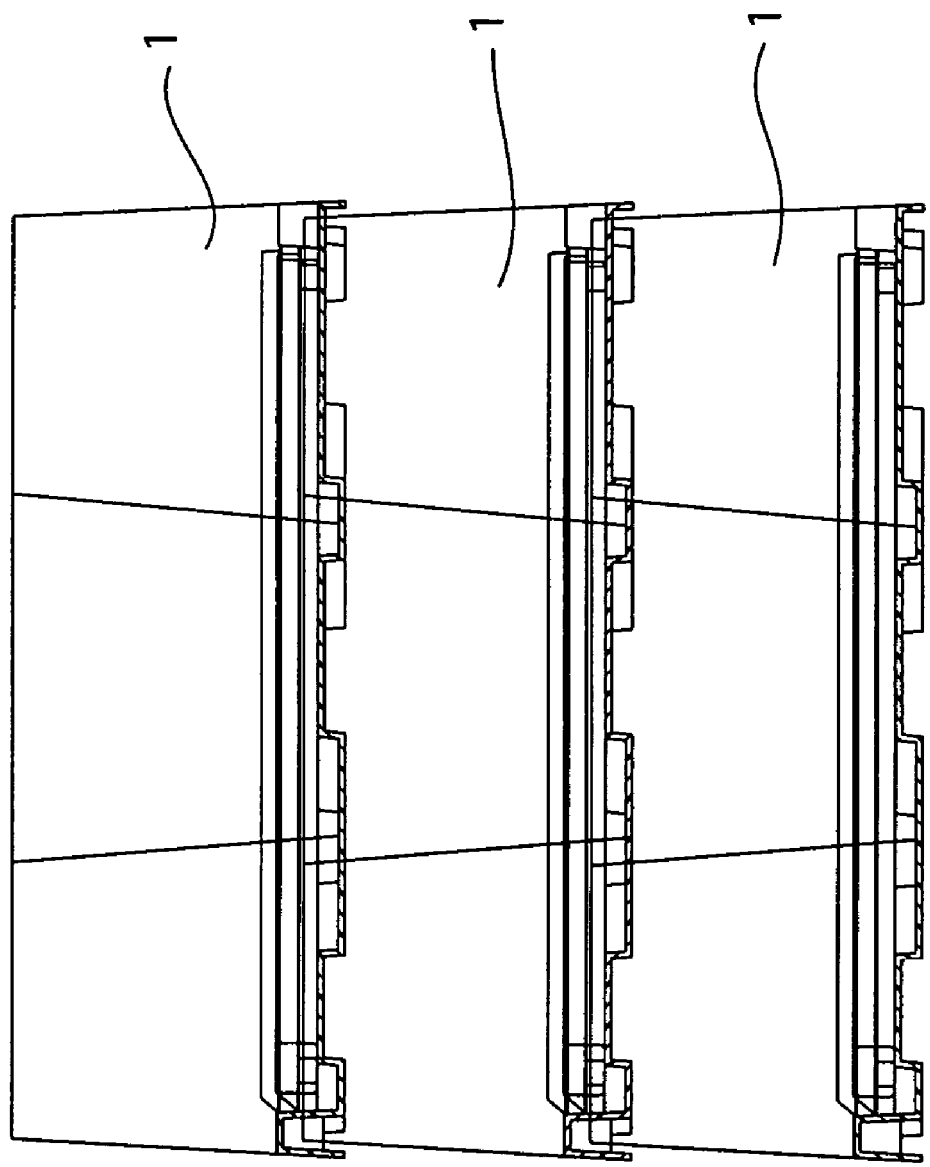
FIG. 15 is a cross-sectional view of the stack of shipping cradles of FIG. 14 taken along the line XV-XV.

With further reference to FIGS. 13-15, a shipping cradles 1 are substantially similar to the cradles 1A just described, except that the walls 3-6 are 3 inches high for use with smaller seedlings. The 3 inch cradles can be stacked to heights of at least 18-20 cradles. The gaps 10A are sufficiently large to permit insertion and removal of the trays of seedlings to between the vertically-adjacent shipping cradles 1. Although the shipping cradle 1 has been described as having either 3 inch or 6 inch high walls, the same basic configuration may be utilized to provide a shipping cradle having a wide variety of heights, depending upon the requirements for a particular application. The cradles 1 also have a dimension "X" of 43.50 inches and a dimensions "Y" of 23.50 inches. The trays of seedlings may be a "full size" tray 2 having outside dimensions of 21.25 inches in length and 11.00 inches in width in plan view (FIG. 14). Alternately, "strip trays" 2A having a length of 21.25 inches and a width of 5.50 inches may be utilized. The walls 3, 4, 5, 6 are spaced to accommodate a single full size tray 2 or a pair of strip trays 2A between a pair of the walls. Raised areas 30 between channels 12 have flat upper surfaces 31 that stably support the trays 2 and/or 2A.

In use, the trays of seedlings corresponding to a particular customer's order are placed in the shipping cradles, and the cradles are placed in a pallet 9. The trays of seedlings may be all of the same type of plant, or the age and/or plant varieties of the trays may be different as required to fill an order. Vertically adjacent cradles are oriented 180° opposite to each other, and stacked. After the required number of cradles are stacked, the stack is shrink wrapped to prevent separation. When the required number of trays of seedlings of the various desired types are loaded, the pallet with the cradles is shipped from the greenhouse to the purchaser. After the trays of seedlings are removed, the empty cradles are nested together and shipped back to the greenhouse. Alternately, the purchaser may chose to leave the stacked shipping cradles with trays of seedlings positioned on the pallet 9 for a period of time. The pallets 9 include drainage openings, such that trays of seedlings 2 can be watered while they are in the stacked configuration on the pallet 9. Because the trays of seedlings are stacked, they occupy substantially less floor space in the purchaser's greenhouse or the like compared to if the trays of seedlings were immediately spread out after receipt by the purchaser. In general, due to the high cost of previously utilized steel carts, the greenhouse was only able to purchase a limited number of the steel carts. Thus, when prior steel carts are utilized to ship trays of seedlings, the purchaser was generally required to immediately unload the trays of seedlings, and ship the empty steel racks back to the greenhouse. Thus, use of prior steel carts generally required paying for "two-way" shipping, adding to the total cost to transport the seedlings. In contrast, the shipping cradles of the present invention are low cost, such that a large number can be economically purchased by the greenhouse, the purchaser can accumulate a significant number of the shipping cradles and pallets over a period of time. The pallets can be nested and stored until a sufficient number are accumulated. A large number of nested cradles and pallets can then be returned to the greenhouse in a compact form in a single shipment, thereby substantially reducing the costs of the shipping operation. Significantly, the cradles are quite lightweight and compact when nested, such that the cost of shipping the cradles back to the greenhouse is substantially lower than required if steel carts or the like are utilized. Also, a climate controlled vehicle is not required during when shipping the empty cradles back to the greenhouse, such that the shipping costs are also reduced for this reason.

Significantly, the gaps 10 between the vertically-adjacent cradles permit visual inspection of the trays 2 in a manner that is not possible with conventional cardboard boxes that are sealed. Thus, a user can readily determine what seedlings are present, and can also determine the condition of the seedlings. Also, the shipping cradles may include a bar code permanently affixed to the cradle, such that the cradles can be tracked during the shipping process. Still further, the configuration of the shipping cradles permits the 3-inch high cradles 1 to be stacked with the 6-inch cradles 1A. This feature permits a wide variety of seedlings of different sizes to be shipped together as required by a purchaser. Prior wheeled carts cannot be readily disassembled, and are quite large and heavy when loaded, thereby creating difficulty if a ramp or the like is not available at the greenhouse or the destination. In contrast, the handles and lightweight construction of the shipping pallet of the present invention permit the pallet to be easily lifted and transported during shipping. The position of the handles 8 in the center walls 4 and 5 provides pick up points that are relatively close together to permit grasping by a user, and also reduces the bending load that would otherwise occur if the pallet were picked up along the opposite side edges. Furthermore, the colors of the shipping cradle can be chosen to match the logo or other marketing arrangement of a particular company.

Also, the greenhouse or other user receiving the cradles with the trays of seedlings can unstack the cradles and leave the trays of seedlings in the cradles for a period of time. The drainage provided by the cradles permits the watering of the seedlings so they can be grown in the greenhouse or other such facility.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A shipping cradle for transport of trays of seedlings, the shipping cradle comprising:
a body made of a thin sheet of polymer material having generally constant wall thickness;
the body including at least first, second, third, and fourth upwardly extending generally parallel walls with a first tray support surface extending between the first and second walls to define a first tray support area, a second tray support surface extending between the second and third walls to define a second tray support area, a third tray support surface extending between the third and fourth walls to define a third tray support area;
at least one tray of seedlings disposed on a selected one of the first, second, and third tray support areas; and wherein:
the at least first, second, third and fourth walls each include a main wall section and an offset wall section to permit nesting of vertically adjacent cradles of substantially identical configuration to said shipping cradle when vertically adjacent cradles have the same orientation, and for stacking of cradles in a spaced-apart configuration when vertically adjacent cradles are oriented 180° opposite one another; and wherein
the first tray support area includes an upwardly-facing tray support surface defining a tray support height;
each of the upwardly extending walls has a pair of thin webs and an upper edge portion extending transversely between the thin webs to form U-shaped cross section that opens downwardly, and wherein each of the thin webs has a lower web portion at about the same height as the tray support height and an upper web portion connected to the upper edge portion, each thin web further including a central portion extending between the upper and lower web portions.

2. A combination shipping cradle and a plurality of trays of seedlings, the shipping cradle comprising:
a body defining a perimeter having opposite side edges;
the body including at least first, second, third, and fourth upwardly extending generally parallel walls extending between the opposite side edges and defining a first tray support surface extending between the first and second walls to define a first tray support area, a second tray support surface extending between the second and third walls to define a second tray support area, a third tray support surface extending between the third and fourth walls to define a third tray support area; and:
at least first, second, and third substantially flat trays of seedlings positioned in the first, second, and third tray support areas, each of the trays of seedlings having opposite ends positioned adjacent the opposite side edges of the body; wherein
the at least first, second, third and fourth walls each include a main wall section and an offset wall section to permit nesting of vertically adjacent cradles of substantially identical configuration to said shipping cradle when vertically adjacent cradles have the same orientation, and for stacking of cradles in a spaced-apart configuration when vertically adjacent cradles are oriented 180° opposite one another; and
each of the main wall sections comprises a pair of outer wall sections, and the offset wall sections comprise center wall sections between each pair of outer wall sections.

3. A shipping system for transport of trays of seedlings, comprising:
a plurality of trays of seedlings having dimensions of about 21.0 inches by 11.0 inches in plan view;
a plurality of shipping cradles stacked upon one another, each shipping cradle including a body made of a thin sheet of polymer material having generally constant wall thickness, the body defining a horizontal lower side;

each body including a lower surface, and at least first, second, third, and fourth upwardly extending generally parallel walls with a first tray support surface extending between the first and second walls to define a generally quadrilateral first tray support area having opposite sides bounded by the first and second walls, and opposite ends, a generally quadrilateral second tray support surface extending between the second and third walls to define a second tray support area having opposite sides bounded by the second and third walls, and opposite ends, a generally quadrilateral third tray support surface extending between the third and fourth walls to define a third tray support area having opposite sides bounded by the third and fourth walls, and opposite ends, the at least first, second, third and fourth walls defining opposite ends having upper edge portions;

each body including upwardly-facing surfaces extending between the opposite ends of the first, second, third and fourth walls, wherein the upwardly-facing surfaces are spaced below the upper edge portions of the at least first, second, third and fourth walls such that the opposite ends of the at least first, second and third tray support areas are substantially open, and the upwardly-facing surfaces and the first, second, third and fourth walls define three upwardly-opening enlarged U-shaped portions in a front elevational view of the body in a plane coincident with the horizontal lower side and coincident with at least a selected one of the walls; and wherein:

the lower surfaces of the cradles extend across the U-shaped portions of vertically adjacent cradles to define access openings when a plurality of cradles are stacked in a spaced apart configuration having sufficient size to permit insertion and removal of the trays of seedlings through the access openings to and from the first, second, and third tray support areas without unstacking or moving vertically adjacent cradles.

4. The shipping cradle of claim 3, wherein:

the upwardly-facing surfaces are spaced above the first, second and third tray support surfaces.

* * * * *